United States Patent
Kawamoto

(10) Patent No.: US 6,542,067 B1
(45) Date of Patent: Apr. 1, 2003

(54) BARIUM TITANATE SEMICONDUCTOR CERAMIC POWDER AND LAMINATED SEMICONDUCTOR CERAMIC DEVICE

(75) Inventor: Mitsutoshi Kawamoto, Hirakata (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 09/575,581

(22) Filed: May 22, 2000

(30) Foreign Application Priority Data

May 20, 1999 (JP) .............................. 11-139781
Feb. 23, 2000 (JP) ........................ 2000-046122

(51) Int. Cl.⁷ .............................. H01L 7/10; H01L 7/13
(52) U.S. Cl. ..................... 338/22 R; 338/21; 338/225
(58) Field of Search .................... 338/22 R, 22 SD, 338/21, 224, 225

(56) References Cited

U.S. PATENT DOCUMENTS 5,445,806 A * 8/1995 Kinugasa et al. ........... 423/598
5,820,995 A * 10/1998 Niimi ....................... 428/469

FOREIGN PATENT DOCUMENTS

| DE | 19902151 | | 7/1999 |
| DE | 19902153 | | 7/1999 |
| JP | 403035503 | * | 2/1991 |
| JP | 406053011 | * | 2/1994 |

* cited by examiner

Primary Examiner—Elvin Enad
Assistant Examiner—Kyung Lee
(74) Attorney, Agent, or Firm—Dickstein, Shapiro, Morin & Oshinsky, LLP.

(57) ABSTRACT

A compact and low resistance laminated semiconductor ceramic device which is provided with a positive resistance-temperature characteristic and has a broad resistance-change range and a high breakdown voltage in addition to ohmic contact between semiconductor ceramic layers and internal electrodes is provided. A doped barium titanate semiconductor ceramic having an average particle diameter of not more than about 1.0 μm, a c/a axis ratio of not less than about 1.005, and a barium site/titanium site ratio from about 0.99 to 1.01, in which a donor element, such as lanthanum (La), is used.

21 Claims, 1 Drawing Sheet

BARIUM TITANATE SEMICONDUCTOR CERAMIC POWDER AND LAMINATED SEMICONDUCTOR CERAMIC DEVICE

BACKGROUND OF THE INVENTION

1. Field of the Invention

The present invention relates to a barium titanate semiconductor ceramic powder and to a laminated semiconductor ceramic device having a positive resistance-temperature characteristic provided with a semiconductor ceramic layer formed by sintering the barium titanate semiconductor ceramic powder.

2. Description of the Related Art

Barium titanate semiconductor ceramics can have positive resistance-temperature characteristics (positive temperature coefficient characteristic or PTC characteristic) in which resistivity at room temperature is low and resistance rapidly increases above a certain temperature (Curie temperature). They are widely used in temperature control and current control and the like devices. Among these, an overcurrent protection device is desired to be compact, to have a high breakdown voltage, and specifically, to have lower resistance at room temperature.

As a device responding to these desires, a laminated semiconductor ceramic device is proposed in, for example, Japanese Laid-open Patent Application No. 57-60802. The laminated semiconductor ceramic device is obtained by alternately laminating semiconductor ceramic layers primarily composed of barium titanate with internal electrodes composed of a platinum-palladium alloy (Pt-Pd alloy) followed by firing. By employing the laminated structure, the area of the internal electrodes in the semiconductor ceramic device can be greatly increased, and hence, miniaturization of the device can be realized.

However, it is difficult to obtain ohmic contact between the internal electrodes and the semiconductor ceramic layers in the laminated semiconductor ceramic device since a Pt-Pd alloy is used as the internal electrodes, and hence, there is the problem in that resistance at room temperature greatly increases.

As a material used for the internal electrodes instead of the Pt-Pd alloy, a nickel-containing metal (hereinafter referred to as Ni-based metal), such as nickel or an alloy containing nickel, is proposed in, for example, Japanese Laid-open Patent Application No. 6-151103. An internal conductive material composed of a Ni-based metal and the semiconductor ceramic show superior ohmic contact therebetween, and as a result, an increase of resistance at room temperature can be prevented. However, the Ni-based metal forming the internal electrodes is readily oxidized in a general firing step in the air. Consequently, after a firing step in a reducing atmosphere is performed, a re-oxidizing step is required to take place at a relatively low temperature so that the Ni-based metal is not oxidized. This causes the problem that resistance-change range is reduced to be lower by two orders of magnitude. Accordingly, the breakdown voltage thereof is not sufficient, and there is a problem in practical use.

SUMMARY OF THE INVENTION

Accordingly, an object of the present invention is to provide a compact and low resistance laminated semiconductor ceramic device having positive resistance-temperature characteristics, in which the laminated semiconductor ceramic device exhibits sufficient change in resistance and a high breakdown voltage in addition to ohmic contact between semiconductor ceramic layers and internal electrodes.

Another object of the present invention is to provide barium titanate semiconductor ceramic powder which is advantageously used for forming the semiconductor ceramic layers provided in the laminated semiconductor ceramic device described above.

To these ends, the inventors of the present invention found through long intensive research that a compact and low resistance laminated semiconductor ceramic device having a sufficient change in resistance and a high breakdown voltage can be obtained by using barium titanate semiconductor ceramic powder provided with certain specified properties.

That is, the barium titanate semiconductor ceramic powder of the present invention has an average particle diameter of not more than about 1.0 $\mu$m, a c/a axis ratio of not less than about 1.005, and a barium (Ba) site/titanium (Ti) site ratio from about 0.99 to 1.01, in which a donor element is dissolved.

Even though the barium titanate semiconductor ceramic powder of the present invention can be synthesized by various synthetic methods, when the barium titanate semiconductor ceramic powder is synthesized by a hydrolysis method, the Ba site/Ti site ratio is preferably from about 0.99 to 1.00, and the barium titanate semiconductor ceramic powder is synthesized by a solid phase method, the Ba site/Ti site ratio is preferably from about 1.00 to 1.01.

The present invention can be applied to a laminated semiconductor ceramic device provided with a plurality of internal electrodes and a plurality of semiconductor ceramic layers alternately laminated with the internal electrodes. In the laminated semiconductor ceramic device, according to the present invention, the semiconductor ceramic layers can be obtained by sintering the barium titanate semiconductor ceramic powder described above.

In the laminated semiconductor ceramic device described above, the internal electrodes is preferably composed of a conductive component containing a Ni-based metal, that is, a nickel-containing metal, such as nickel or a nickel-containing alloy.

DESCRIPTION OF THE PREFERRED EMBODIMENTS

Figure 1:
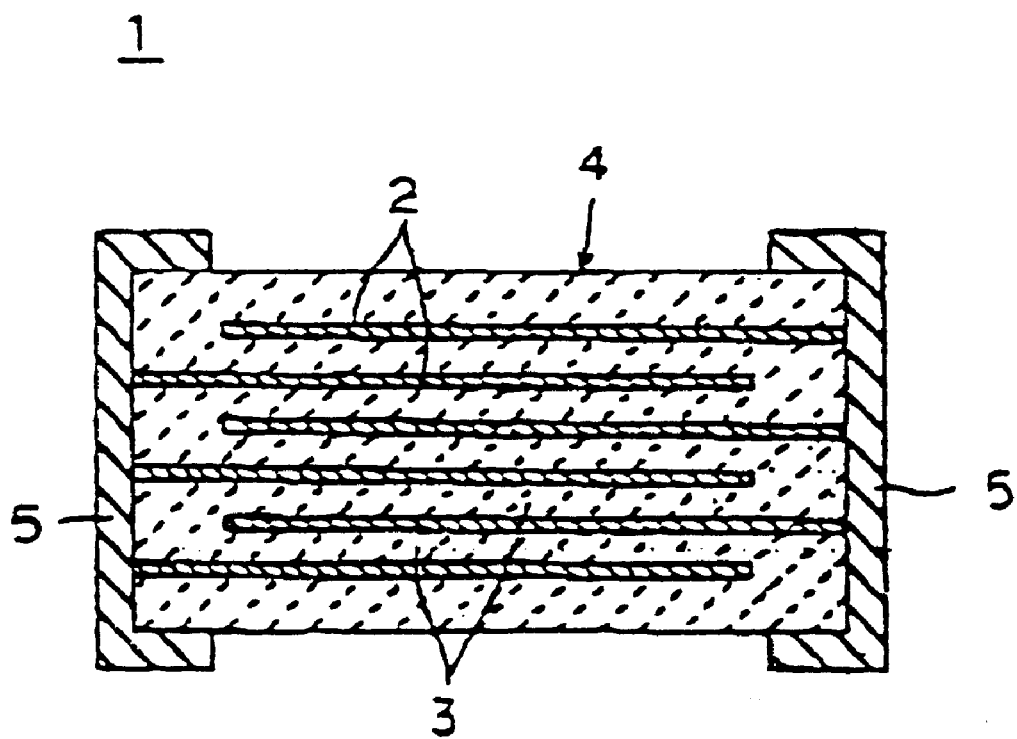
FIG. 1 is a cross-sectional view showing a laminated semiconductor ceramic device 1 according to an embodiment of the present invention.

FIG. 1 is a cross-sectional view showing a laminated semiconductor ceramic device 1 according to an embodiment of the present invention.

The laminated semiconductor ceramic device 1 is provided with an element body 4 formed by firing a plurality of internal electrodes 2 alternately laminated with a plurality of semiconductor ceramic layers 3. External electrodes 5 are formed at two edge surfaces of the element body 4. The external electrodes 5 are electrically connected to specific internal electrodes 2, respectively, and the internal electrodes 2 connected to one of the external electrode 5 and the internal electrodes 2 connected to the other external electrode 5 are alternately disposed.

The laminated semiconductor ceramic device 1 has a positive resistance-temperature characteristic, and is used for, for example, an overcurrent protection device.

The semiconductor ceramic layer 3 is obtained by sintering barium titanate semiconductor ceramic powder. In the barium titanate semiconductor ceramic powder, when necessary, a fraction of the barium may be substituted by calcium (Ca), strontium (Sr), lead (Pb) and the like, or a fraction of the titanium may be substituted by tin (Sn), zirconium (Zr) and the like. Semiconductor-forming agents contained in the barium titanate semiconductor ceramic material are called donor elements. As donor elements, rare earth elements such as lanthanum (La), yttrium (Y), samarium (Sm), cerium (Ce), dysprosium (Dy), gadolinium (Gd) and the like, and transition elements such as niobium (Nb), tantalum (Ta), bismuth (Bi), antimony (Sb), tungsten (W) and the like can be used. In addition, when necessary, silicon dioxide ($SiO_2$), manganese (Mn) and the like may be added to the barium titanate semiconductor ceramic material mentioned above. The quantity is not restricted to any particular range of values.

The barium titanate semiconductor ceramic powder used for forming the semiconductor ceramic layer 3 has an average particle diameter of not more than about 1.0 $\mu$m, a c/a axis ratio of not less than about 1.005, and a Ba site/Ti site ratio from about 0.99 to 1.01, in which the donor element is dissolved. Synthetic methods for the barium titanate semiconductor ceramic powder are not specifically limited; however, methods, such as a hydrothermal method, hydrolysis, coprecipitation, a solid phase method, and a sol-gel method can be used, and when necessary, pre-firing is performed.

It has been experimentally confirmed that when the barium titanate semiconductor ceramic powder is synthesized by a hydrolysis method, the Ba site/Ti site ratio is preferably from about 0.99 to 1.00, and in the case in which a solid phase method is used, the Ba site/Ti site ratio is preferably from about 1.00 to 1.01.

As an electric conductive component contained in the internal electrode 2, a Ni-based metal, a molybdenum (Mo)-containing metal, a chromium (Cr)-containing metal, and an alloy thereof can be used, and specifically, a Ni-based metal is preferably used since reliable ohmic contact with the semiconductor ceramic layer 3 can be achieved.

As an electric conductive component contained in the external electrode 5, silver (Ag), palladium (Pd), and an alloy thereof can be used, and the metals are not so specifically limited compared to those used for the internal electrodes 2.

Hereinafter, the present invention will be described in detail with reference to an example.

EXAMPLE

In Table 1 shown below, barium titanate semiconductor ceramic powder for samples 1 to 8 were synthesized by a hydrolysis method, and barium titanate semiconductor ceramic powders for samples 9 to 20 were synthesized by a solid phase method.

For samples 1 to 8, 15.40 liter of a barium hydroxide aqueous solution containing barium hydroxide at a concentration of 0.2 mole/liter (3.079 moles of barium was contained) and 7.58 liter of a titanium alkoxide solution containing titanium alkoxide at a concentration of 0.35 mole/liter (2.655 moles of titanium was contained) were prepared in separate baths beforehand. The titanium alkoxide solution contains (tetraisopropyl oxide) titanium (Ti(O-iPr)$_4$) dissolved in isopropyl alcohol (IPA). In addition, during the preparation described above, in order to dissolve the lanthanum used as a semiconductor-forming agent, 100 milliliter of an ethanol solution containing lanthanum chloride (0.00664 mole of lanthanum) was added to the titanium alkoxide solution and then homogeneously mixed therewith.

Next, the solutions in the separate baths were mixed together and stirred by a static mixer, so that a reaction was initiated. Accordingly, a slurry containing the barium titanate powder was obtained, and the resulting slurry was held in an oven for 3 hours.

After dehydration and rinsing of the preserved slurry, drying at 110° C. for 3 hours followed by pulverization was performed, and a barium titanate powder containing lanthanum was obtained.

Barium titanate semiconductor ceramic powders having various properties for samples 1 to 8 as shown in Table 1 were obtained by adding barium carbonate ($BaCO_3$) or titanium dioxide ($TiO_2$) so as to have various ratios of Ba site/Ti site in the barium titanate powders containing lanthanum and then by performing pre-firing.

Furthermore, concerning samples 9 to 20, $BaCO_3$ having a specific surface area from 1 to 20 m$^2$/g, $TiO_2$ having a specific surface area from 1 to 50 m$^2$/g and a samarium nitrate solution, as starting raw materials, were measured so as to have an elemental molar ratio Sm/Ti of 0.002, and were then mixed for 5 hours by a ball mill using distilled water and balls composed of PSZ having a diameter of 5 mm. During the preparation, $BaCO_3$ and $TiO_2$ were measured so as to have various Ba site/Ti site ratios.

The mixed solution described above was evaporated and dried, and the resulting mixed powder was calcined at temperatures of 900 to 1,250° C. for 2 hours.

After pulverizing the calcined powder for 5 to 30 hours by a ball mill using distilled water and balls composed of PSZ having a diameter of 5 mm, evaporation and drying were performed. As a result, barium titanate semiconductor ceramic powders having various properties for samples 9 to 20 as shown in Table 1 were obtained.

TABLE 1

| | Barium Titanate Powder Property | | | Device Property | | |
| --- | --- | --- | --- | --- | --- | --- |
| Sample No. | Average Particle Diameter ($\mu$m) | c/a Ratio | Ba/Ti Ratio | Room-Temperature Resistance($\Omega$) | Resistance-Change Range | Breakdown Voltage (V) |
| *1 | 0.1 | 1.0045 | 0.992 | 0.10 | 0.6 | <1 |
| 2 | 0.2 | 1.0050 | 0.992 | 0.12 | 3.5 | 25 |
| 3 | 0.3 | 1.0070 | 0.992 | 0.14 | 3.2 | 22 |
| 4 | 0.3 | 1.0071 | 0.994 | 0.11 | 3.9 | 29 |
| 5 | 0.4 | 1.0071 | 0.994 | 0.12 | 3.7 | 25 |

TABLE 1-continued

| | Barium Titanate Powder Property | | | Device Property | | |
|---|---|---|---|---|---|---|
| Sample No. | Average Particle Diameter ($\mu$m) | c/a Ratio | Ba/Ti Ratio | Room-Temperature Resistance($\Omega$) | Resistance-Change Range | Breakdown Voltage (V) |
| *6 | 0.4 | 1.0072 | 0.988 | 0.25 | 1.5 | 4 |
| 7 | 0.5 | 1.0076 | 0.990 | 0.15 | 3.0 | 21 |
| 8 | 0.4 | 1.0074 | 1.000 | 0.16 | 3.3 | 22 |
| 9 | 0.7 | 1.0070 | 1.000 | 0.20 | 3.5 | 32 |
| 10 | 0.5 | 1.0070 | 1.000 | 0.19 | 3.5 | 31 |
| 11 | 0.2 | 1.0050 | 1.001 | 0.18 | 3.6 | 29 |
| 12 | 0.8 | 1.0080 | 1.001 | 0.15 | 3.7 | 31 |
| *13 | 1.5 | 1.0085 | 1.002 | 0.10 | 1.0 | 2 |
| 14 | 1.0 | 1.0090 | 1.002 | 0.10 | 3.9 | 29 |
| 15 | 0.2 | 1.0060 | 1.005 | 0.10 | 4.0 | 30 |
| *16 | 1.5 | 1.0100 | 1.002 | 0.09 | 0.9 | 1.5 |
| *17 | 0.1 | 1.0043 | 1.004 | 0.12 | 0.4 | <1 |
| *18 | 0.88 | 1.0083 | 1.013 | 2.20 | 2.0 | 6 |
| 19 | 0.85 | 1.0079 | 1.010 | 0.19 | 3.6 | 30 |
| 20 | 1.0 | 1.0090 | 1.010 | 0.20 | 3.4 | 31 |

The average particle diameters of the resulting calcined powders shown in Table 1 were obtained by an image analysis using scanning electron microscopic (SEM) photographs. Ba site/Ti site ratios (shown as Ba/Ti ratio in the table) and c/a axis ratios were obtained by a fluorescent x-ray analysis and x-ray diffraction patterns, respectively.

After adding organic solvents, organic binders, plasticizers and the like to powders for individual samples so as to prepare ceramic containing slurries, the slurries mentioned above were processed by the doctor blade method, whereby ceramic green sheets were obtained.

A laminate to be formed into an element body was formed by the steps of screen-printing a conductive paste containing nickel on specific ceramic green sheets to form the internal electrodes, laminating the green sheets provided with the internal electrodes so as to obtain the element body as shown in FIG. 1, laminating ceramic green sheets having no internal electrodes on the laminated green sheets at the top and bottom thereof, and compressing and then cutting the laminated green sheets.

After removing the binders from these laminates in air, firing in a strong reducing atmosphere with a hydrogen/nitrogen ratio of 3/100 for 2 hours was performed, and fired element bodies were obtained. Then, a re-oxidation treatment at 600 to 1,000° C. for 1 hour in air was performed. Subsequently, laminated semiconductor ceramic devices were obtained by coating a silver paste on both edge faces of the element bodies followed by firing in the air. Each resulting device is approximately 3.2 mm long, 2.5 mm wide and 1.0 mm thick.

Room-temperature resistances, resistance-change ranges, and breakdown voltages were measured for the laminated semiconductor ceramic devices thus formed. Room-temperature resistance was measured by a four-point probe method using a digital voltmeter. The resistance-change range (order of magnitude) was represented by a common logarithm of the value obtained by dividing the maximum resistance by the minimum resistance from room temperature to 250° C. The breakdown voltage was represented by the maximum applied voltage just before device failure. The results are shown in Table 1.

In Table 1, sample numbers with asterisks are out of the range of the present invention.

Referring to Table 1, when the average particle diameter was not more than about 1.0 $\mu$m, a c/a axis ratio was not less than about 1.005, and a Ba site/Ti site ratio was from about 0.99 to 1.01, as in samples 2 to 5, 7 to 12, 14, 15, 19 and 20, the resulting device had room-temperature resistance of not more than 0.20 $\Omega$, a resistance-change range of not less than three orders of magnitude, and a breakdown voltage of not less than 20 volts.

In contrast, when the average particle diameter of the barium titanate powder exceeded about 1.0 $\mu$m, as in samples 13 and 16, the resulting device had a resistance-change range of less than 3.0 orders of magnitude and the breakdown voltage decreased to 2 volts.

When the c/a axis ratio was less than about 1.005 as in samples 1 and 17, the resistance-change range of the resulting device was extremely small and the breakdown voltage was also extremely decreased.

When the Ba site/Ti site ratio was less than about 0.99 or more than 1.01 as in samples 6 and 18, respectively, the room-temperature resistance of the resulting device increased and the resistance-change range and breakdown voltage were much decreased.

Samples 2 to 5, 7 and 8 showing superior properties among samples 1 to 8 formed by using the barium titanate powder synthesized by a hydrolysis method, have Ba site/Ti site ratios from about 0.99 to 1.00, and samples 9 to 12, 14, 15, 19 and 20 showing superior properties among samples 9 to 20 formed by using the barium titanate powder synthesized by a solid phase method, have Ba site/Ti site ratios from about 1.00 to 1.01.

As has been thus described, the barium titanate semiconductor ceramic powder of the present invention has an average particle diameter of not more than about 1.0 $\mu$m, a c/a axis ratio of not less than about 1.005, and a Ba site/Ti site ratio from about 0.99 to 1.01, in which a donor element is dissolved. Consequently, the laminated semiconductor ceramic device provided with the semiconductor ceramic layer obtained by sintering the barium titanate semiconductor ceramic powder is compact and has low resistance, and has a sufficient resistance-change range, and in addition, has a high breakdown voltage.

In particular, in the case in which the Ba site/Ti site ratios are about 0.99 to 1.00, and about 1.00 to 1.01 when the barium titanate semiconductor ceramic powders of the present invention are produced by a hydrolysis method and a solid phase method, respectively, the superior properties described above can be reliably obtained.

In the laminated semiconductor ceramic device, when the internal electrodes contain nickel, ohmic contact between the internal electrodes and the semiconductor ceramic layers can be reliably achieved.

What is claimed is:

1. A donor element doped barium titanate semiconductor ceramic powder having an average particle diameter which does not exceed about 1.0 μm, a c/a axis ratio of at least about 1.005 but less than 1.0100, and a barium site/titanium site ratio from about 0.99 to 1.01.

2. A donor element barium titanate semiconductor ceramic powder according to claim 1, wherein the barium titanate semiconductor ceramic powder is a hydrolysis synthesized barium titanate having a barium site/titanium site ratio from about 0.99 to 1.00.

3. A donor element barium titanate semiconductor ceramic powder according to claim 2, wherein the donor element is a rare earth metal.

4. A donor element barium titanate semiconductor ceramic powder according t o claim 3, wherein the rare earth metal is La.

5. In a laminated semiconductor ceramic device comprising a plurality of internal electrodes and a plurality of semiconductor ceramic layers alternately laminated with the internal electrodes, the improvement which comprises the semiconductor ceramic being a sintered barium titanate semiconductor ceramic powder according to claim 2.

6. A laminated semiconductor ceramic device according to claim 5, wherein the internal electrodes comprise nickel.

7. A donor element barium titanate semiconductor ceramic powder according to claim 1, wherein the barium titanate semiconductor ceramic powder is a solid phase synthesized barium titanate having a barium site/titanium site ratio from about 1.00 to 1.01.

8. A donor element barium titanate semiconductor ceramic powder according to claim 7, wherein the donor element is a rare earth metal.

9. A donor element barium titanate semiconductor ceramic powder according to claim 8, wherein the rare earth metal is La.

10. In a laminated semiconductor ceramic device comprising a plurality of internal electrodes and a plurality of semiconductor ceramic layers alternately laminated with the internal electrodes, the improvement which comprises the semiconductor ceramic being a sintered barium titanate semiconductor ceramic powder according to claim 7.

11. A laminated semiconductor ceramic device according to claim 10, wherein the internal electrodes comprise nickel.

12. A donor element barium titanate semiconductor ceramic powder according to claim 1, wherein the donor element is a rare earth metal.

13. A donor element barium titanate semiconductor ceramic powder according to claim 12, wherein the rare earth metal is La.

14. A donor element doped barium titanate semiconductor ceramic powder according to claim 1 having an average particle diameter which does not exceed about 0.85 μm and a c/a axis ratio of at least about 1.006.

15. A donor element barium titanate semiconductor ceramic powder according to claim 14, wherein the donor element is a rare earth metal.

16. A donor element barium titanate semiconductor ceramic powder according to claim 15, wherein the rare earth metal is La.

17. In a laminated semiconductor ceramic device comprising a plurality of internal electrodes and a plurality of semiconductor ceramic layers alternately laminated with the internal electrodes, the improvement which comprises the semiconductor ceramic being a sintered barium titanate semiconductor ceramic powder according to claim 14.

18. A laminated semiconductor ceramic device according to claim 17, wherein the internal electrodes comprise nickel.

19. In a laminated semiconductor ceramic device comprising a plurality of internal electrodes and a plurality of semiconductor ceramic layers alternately laminated with the internal electrodes, the improvement which comprises the semiconductor ceramic being a sintered barium titanate semiconductor ceramic powder according to claim 1.

20. A laminated semiconductor ceramic device according to claim 19, wherein the internal electrodes comprise nickel.

21. A laminated semiconductor ceramic device according to claim 19 which has a room temperature resistance of not more than 0.20 Ω, a resistance change range of not less than three orders of magnitude and a breakdown voltage of not less than 20 volts.

* * * * *